(12) United States Patent
Tseng et al.

(10) Patent No.: US 8,463,060 B2
(45) Date of Patent: Jun. 11, 2013

(54) METHOD FOR ESTIMATING IMAGE SIZE AFTER COMPRESSION

(75) Inventors: Chun-Hua Tseng, Taoyuan County (TW); Yoa-Ren Hsu, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 51 days.

(21) Appl. No.: 13/223,310

(22) Filed: Aug. 31, 2011

(65) Prior Publication Data
US 2013/0011073 A1   Jan. 10, 2013

(30) Foreign Application Priority Data
Jul. 6, 2011   (TW) .............................. 100123894 A

(51) Int. Cl.
*G06K 9/36* (2006.01)
*G06K 9/46* (2006.01)

(52) U.S. Cl.
USPC ........................................................ 382/239

(58) Field of Classification Search
USPC ..................... 382/239, 251, 282; 375/240.03, 375/240.24
See application file for complete search history.

(56) References Cited

U.S. PATENT DOCUMENTS 7,536,058 B2 * 5/2009 Matsutani ..................... 382/239
2005/0084007 A1 * 4/2005 Lightstone et al. ...... 375/240.03

* cited by examiner

*Primary Examiner* — Phuoc Tran
(74) *Attorney, Agent, or Firm* — Jianq Chyun IP Office

(57) ABSTRACT

A method for estimating an image size after compression suitable for an electronic apparatus is provided. In the invention, a raw image is received, and the raw image is sampled for obtaining a sampling image. The sampling image is compressed at a plurality of testing parameters of compression respectively for obtaining a plurality of testing sizes after compression. An estimated math model is established according to the testing parameters of compression and the testing sizes after compression. A target parameter of compression corresponding to a target size after compression is calculated through the estimated math model.

9 Claims, 2 Drawing Sheets

METHOD FOR ESTIMATING IMAGE SIZE AFTER COMPRESSION

CROSS-REFERENCE TO RELATED APPLICATION

This application claims the priority benefit of Taiwan application ser. no. 100123894, filed on Jul. 6, 2011. The entirety of the above-mentioned patent application is hereby incorporated by reference herein and made a part of this specification.

BACKGROUND OF THE INVENTION

1. Field of the Invention

The invention relates generally to an image compression scheme, and more particularly to a method for estimating a size of a compressed image.

2. Description of Related Art

Generally speaking, a color filter array (CFA) is constructed by interlacing three or more color filter channels, in which each of the color filter channels allows visible light of specific frequencies to pass towards the corresponding image sensor. Therefore, during operation, the color content is resolved by the corresponding sensor element.

A conventional compression method samples the green color information on the CFA and thereafter adopts a summation of a first-order derivative as a reference basis. However, the conventional method generates inaccurate estimations of image compression ratio. A reason for this phenomenon is that, when a main feature appears in red and blue colors, the summation result of the green samples brings about a severe underestimation. Consequently, the selection of the testing compression parameters is impacted, which will result in large discrepancies of the real size of compressed image. On the other hand, when reproducing images having a fixed frequency distribution, such as images captured from the screen of a liquid crystal display (LCD), because such images have a fixed frequency distribution, there is a severe underestimation phenomenon in this case. Moreover, due to adjustment of different parameters in an image, the same image from the CFA would produce dissimilar results. Alternatively, an inaccurate estimation of an image compression may also occur with different sensitivity settings.

However, in order to sample the green color information on the CFA and to adopt the summation of a first-order derivative as the reference basis, a large quantity of samples is needed as the basis for adjusting the testing image size after compression. As different image sizes all require large quantities of image results as the bases thereof, a large amount of calculation time is accordingly wasted.

Furthermore, when the estimated size of the compressed image is inaccurate and the storing memory is insufficient for the compressed image, a write error may result when writing a file. In addition, an extra storage time is wasted.

SUMMARY OF THE INVENTION

The invention provides a method for estimating an image size after compression, capable of enhancing an accuracy rate of the target size of the raw image after compression.

A method for estimating an image size after compression suitable for an electronic apparatus is provided. The method includes the steps of receiving a raw image; sampling the raw image for obtaining a sampling image; compressing the sampling image at a plurality of testing parameters of compression respectively for obtaining a plurality of testing sizes after compression; establishing an estimated math model according to the testing parameters of compression and the testing sizes after compression; and calculating a target parameter of compression corresponding to a target size after compression through the estimated math model.

According to an embodiment of the invention, in the step of sampling the raw image for obtaining the sampling image, the raw image may be first sectioned into a plurality of regions then each of the regions is respectively sampled.

According to an embodiment of the invention, in the step of sampling the raw image for obtaining the sampling image, a sampling window may be defined for sampling the raw image.

According to an embodiment of the invention, the testing parameters of compression includes a first parameter of compression and a second parameter of compression, the testing sizes after compression include a first testing size after compression and a second testing size after compression, the first parameter of compression corresponds to the first testing size after compression, and the second parameter corresponds to the second testing size after compression.

According to an embodiment of the invention, after the step of compressing the sampling image at the testing parameters of compression respectively for obtaining the testing sizes after compression, a first estimated size after compression and a second estimated size after compression may be obtained respectively through the first testing size after compression and the second testing size after compression according to a sampling ratio of the sampling image.

According to an embodiment of the invention, in the step of establishing the estimated math model according to the testing parameters of compression and the testing sizes after compression, the estimated math model is defined, in which the estimated math model includes a first variable, a second variable, and at least a first undetermined coefficient and a second undetermined coefficient. The first parameter of compression and the first estimated size after compression are respectively substituted in the first variable and the second variable of the defined estimated math model for obtaining a first equation to be solved. Moreover, the second parameter of compression and the second estimated size after compression are respectively substituted in the first variable and the second variable of the defined estimated math model for obtaining a second equation to be solved. Thereafter, the first and second undetermined coefficients are calculated by solving the first and second equations, and the first and second undetermined coefficients are substituted in the estimated math model.

According to an embodiment of the invention, the first parameter of compression is less than the second parameter of compression, and after the step of obtaining the first testing size after compression, whether the first testing size of compression obtained through the first parameter of compression falls within a target range may be determined. When the first testing size after compression is not within the target range, a binary search is conducted to adjust the first parameter of compression, until the first testing size after compression obtained falls within the target range.

According to an embodiment of the invention, in the step of calculating the target parameter of compression corresponding to the target size after compression through the estimated math model, an inverse function model of the estimated math model may be calculated, then the target size after compression is substituted in the inverse function model to obtain the target parameter after compression. The estimated math model is a polynomial function model, for example.

In summary, according to embodiments of the invention, when the raw image is received, after sampling the entire raw image, the parameters of compression of the entire sampling image is estimated again. Through a stable, fast and accurate estimated math model, an inaccurate estimation problem of the target size of a compressed image may be effectively alleviated, such that the image size after compression meets an expectation.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Since no explicit mathematical model is currently available for use as a standard to estimate real size of a compressed image, large discrepancies are usually generated after compressing an image. Accordingly, the invention provides a method of estimating an image size after compression, capable of enhancing an accuracy rate of the target size of the raw image after compression. In order to make the invention more comprehensible, embodiments are described below as the examples to prove that the invention can actually be realized.

Figure 1:
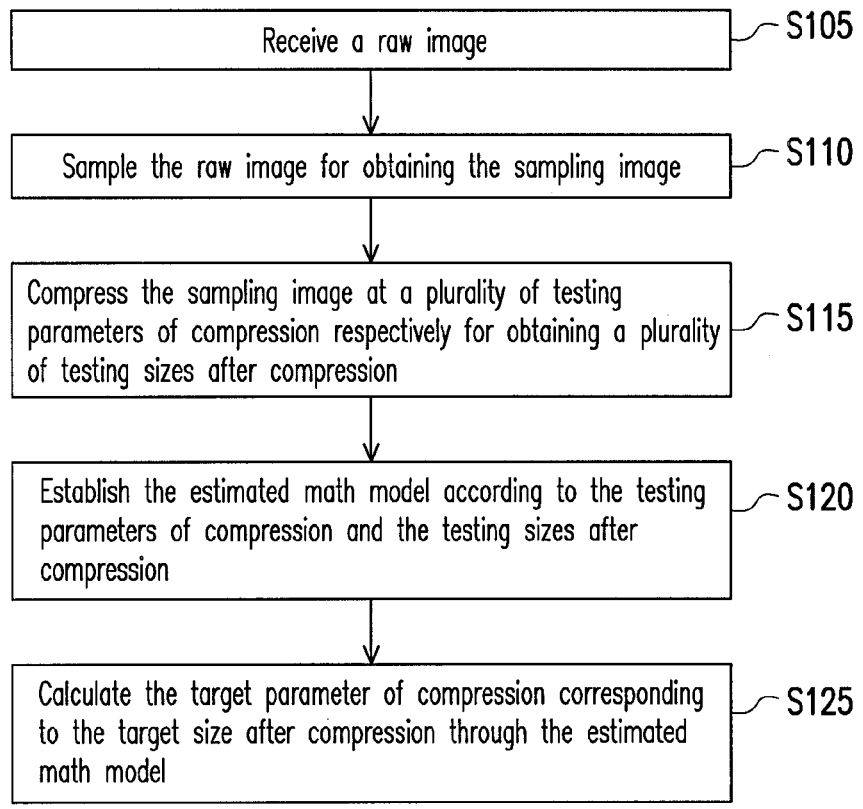
FIG. 1 is a flow chart of a method for estimating size of a compressed image according to an embodiment of the invention.

FIG. 1 is a flow chart of a method for estimating an image size after compression according to an embodiment of the invention. In the present embodiment, the method for estimating the image size after compression may be adapted for an electronic apparatus having a processing unit which performs the steps included in the method for estimating the image size after compression.

Referring to FIG. 1, in a Step S105, a raw image is received. In a Step S110, the raw image is sampled for obtaining a sampling image. A sampling window may be defined for sampling the raw image. In other embodiments of the invention, a pixel may be directly used as a sampling unit. Moreover, in order to avoid uneven sampling quantities due to a crowding phenomenon generated in the sampling range, the raw image may be sectioned into a plurality of regions, in which each of the regions is respectively sampled.

Figure 2:
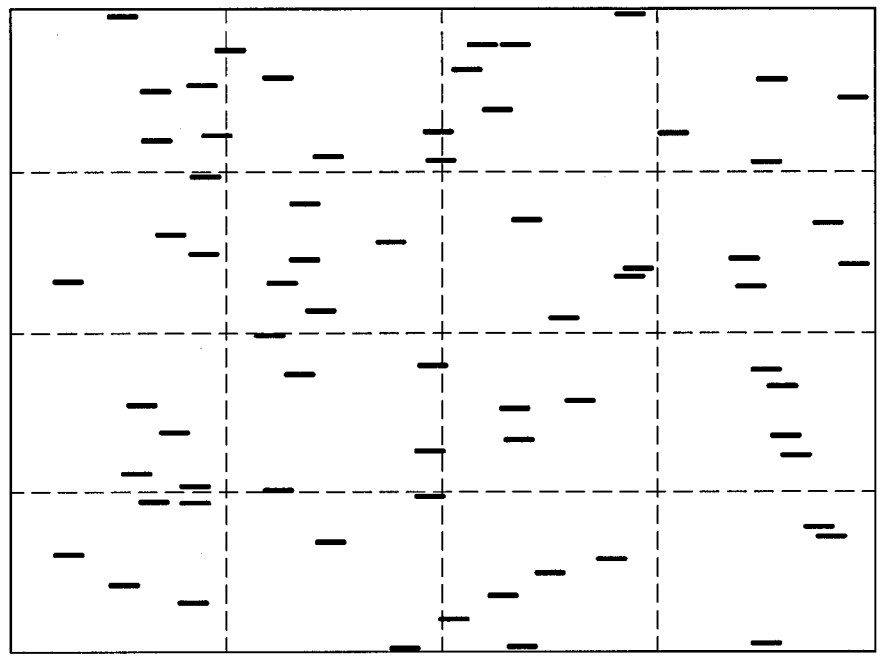
FIG. 2 is a schematic view of a sampling according to an embodiment of the invention.

For example, FIG. 2 is a schematic view of a sampling according to an embodiment of the invention. Referring to FIG. 2, in the present embodiment, the short black lines represent sampling windows. The raw image is sectioned into 4×4 regions, so as to evenly distribute an sampling amount to 16 regions.

In a Step S115, the sampling image is compressed at a plurality of testing parameters of compression respectively for obtaining a plurality of testing sizes after compression. In the present embodiment, a testing parameter of compression is, for example, a quality factor (QF). In one example, assume that the testing parameters of compression include a first parameter of compression and a second parameter of compression, and assume the testing size after compression obtained by the first and second parameters of compression are a first testing size after compression and a second testing size after compression, respectively.

In a Step S120, an estimated math model is established according to the testing parameters of compression and the testing sizes after compression. For example, the estimated math model may be $y=f(x)$, in which y represents a size after compression, and x represents the QF. The first parameter of compression and the second parameter of compression may be predetermined, and it may be assumed exemplarily that the first parameter of compression is less than the second parameter of compression. For example, the first parameter of compression may be set in advance as a QF equaled to 8, and the second parameter of compression may be set as a QF equaled to 128.

After obtaining the first testing size after compression corresponding to QF=8, whether the first testing size after compression falls within a target range may be determined in advance. When the first testing size after compression is not within the target range, a binary search may be conducted to adjust the first parameter of compression, until the first testing size after compression obtained falls within the target range. For example, assume that a target size after compressing the raw image is 3 megabyte (MB), and a sampling ratio of the sampling image is 1/100. In other words, after compressing the sampling image, an ideal value of the first testing size after compression obtained is 300 kilobyte (KB). Therefore, the target range can be assumed to be 280 KB to 320 KB.

Figure 3:
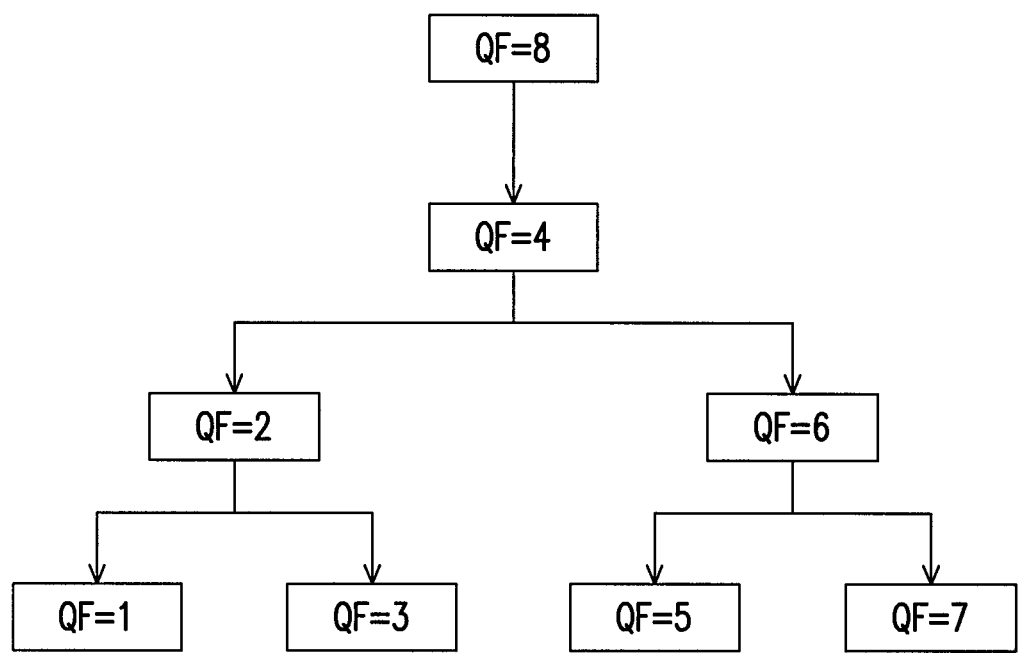
FIG. 3 is a schematic view of a binary search according to an embodiment of the invention.

FIG. 3 is a schematic view of a binary search according to an embodiment of the invention. Referring to FIG. 3, when the sampling image is compressed at QF=8, a first estimated size after compression of 200 KB means over-compression has occurred. Therefore, in order to lower a calculation time, a binary search is conducted to lower the first parameter of compression. QF=4 is first used for compression. When the first estimated size after compression is less than the lowest value of the target range, then QF=2 is used for compression. Conversely, when the first estimated size after compression is greater than the highest value of the target range, then QF=6 is used for compression. When QF=2, if the first estimated size after compression obtained is less than the lowest value of the target range, then QF=1 is used for compression. Conversely, when the first estimated size after compression obtained is greater than the lowest value of the target range, then QF=3 is used for compression. When QF=6, if the first estimated size after compression obtained is less than the lowest value of the target range, then QF=5 is used for compression. Conversely, when the first estimated size after compression obtained is greater than the lowest value of the target range, then QF=7 is used for compression. Accordingly, a binary search is conducted to determine the first parameter of compression, until the first testing size after compression obtained falls within the target range. Furthermore, the second parameter of compression may also be determined by the afore-described method.

After determining the first and second testing parameters of compression, according to the sampling ratio of the sampling image, a first estimated size after compression and a second estimated size after compression may be obtained respectively through the first testing size after compression and the second testing size after compression. In other words, the first and second testing sizes after compression are the compression results obtained after the sampling image has undergone compression. By respectively multiplying the first and second testing sizes after compression by the sampling ratio, the compression results obtained respectively after using the first and second testing parameters of compression to perform compression on the raw image may be estimated.

Thereafter, the estimated math model is defined, in which the estimated math model includes a first variable, a second variable, and at least a first undetermined coefficient and a second undetermined coefficient. In the present embodiment, the estimated math model is a polynomial function model, such as '$y=ax^b$', in which 'a' and 'b' are respectively the first and second undetermined coefficients, and 'x' and 'y' are respectively the first and second variables. Assume in an example that the first parameter of compression is '$x_1$', the first estimated size after compression is '$y_1$', the second parameter of compression is '$x_2$', and the second estimated size after compression is '$y_2$'.

The first parameter of compression $x_1$ and the first estimated size after compression '$y_1$' are respectively substituted in the first variable 'x' and the second variable 'y' of the defined estimated math model for obtaining a first equation to be solved. Moreover, the second parameter of compression '$x_2$' and the second estimated size of compression '$y_2$' are respectively substituted in the first variable 'x' and the second variable 'y' of the defined estimated math model for obtaining a second equation to be solved.

Thereafter, the first and second undetermined coefficients 'a' and 'b' may be calculated by solving the first and second equations. The first and second undetermined coefficients 'a' and 'b' are then substituted in the estimated math model. In other words, since the estimated math model has two undetermined coefficients (e.g., the first and second undetermined coefficients 'a' and 'b'), therefore the undetermined coefficients may be derived by merely determining two sets of variables ($x_1$, $y_1$) and ($x_2$, $y_2$) for substitution in the estimated math model.

After establishing the estimated math model, in a Step S125, a target parameter of compression corresponding to a target size after compression is calculated through the estimated math model. Accordingly, the raw image may be compressed with the target parameter of compression. Specifically, an inverse function model of the estimated math model may be first calculated. The target size after compression is substituted in the inverse function model to obtain the target parameter of compression.

Moreover, people ordinarily skilled in the art can realize the afore-described method of estimating an image size after compression with a computer program, and use a storage medium accessible to the electronic apparatus storing the computer program to enable the electronic apparatus to execute the steps of the method of estimating an image size after compression.

In view of the foregoing, according to embodiments of the invention, after sampling the raw image, an estimated math model is established according to the testing parameters of compression and the testing sizes after compression obtained by compressing the sampling image. Accordingly, through the estimated math model, an inaccurate estimation problem of the target size after compression of an image may be effectively alleviated, such that the image size after compression meets an expectation. When capturing images, the most suitable estimated math model may be established instantaneously. Moreover, the target parameter of compression corresponding to the target size after compression may be obtained through the estimation math model, and the raw captured image can be compressed at the target parameter of compression.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for estimating an image size after compression, suitable for an electronic apparatus, the method comprising:
   receiving a raw image by using a processing circuit of the electronic apparatus;
   sampling the raw image for obtaining a sampling image using the processing circuit;
   compressing the sampling image at a plurality of testing parameters of compression respectively for obtaining a plurality of testing sizes after compression using the processing circuit;
   establishing an estimated math model according to the testing parameters of compression and the testing sizes after compression using the processing circuit; and
   calculating a target parameter of compression corresponding to a target size after compression through the estimated math model using the processing circuit.

2. The method for estimating the image size after compression as claimed in claim 1, wherein the step of sampling the raw image for obtaining the sampling image comprises:
   sectioning the raw image into a plurality of regions; and
   respectively sampling the regions.

3. The method for estimating the image size after compression as claimed in claim 1, wherein the step of sampling the raw image for obtaining the sampling image comprises:
   defining a sampling window for sampling the raw image.

4. The method for estimating the image size after compression as claimed in claim 1, wherein the testing compression parameters comprise a first parameter of compression and a second parameter of compression, the testing sizes after compression comprise a first testing size after compression and a second testing size after compression, the first parameter of compression corresponds to the first testing size after compression, and the second parameter of compression corresponds to the second testing size after compression.

5. The method for estimating the image size after compression as claimed in claim 4, wherein after the step of compressing the sampling image at the testing parameters of compression respectively for obtaining the testing sizes after compression, the method further comprises:
   obtaining a first estimated size after compression and a second estimated size after compression respectively through the first testing size after compression and the second testing size after compression according to a sampling ratio of the sampling image.

6. The method for estimating the image size after compression as claimed in claim 5, wherein the step of establishing the estimated math model according to the testing parameters of compression and the testing sizes after compression comprise:
   defining the estimated math model, wherein the estimated math model comprises a first variable, a second variable, and at least a first undetermined coefficient and a second undetermined coefficient; and
   respectively substituting the first parameter of compression and the first estimated size after compression in the first variable and the second variable of the defined estimated math model for obtaining a first equation to solve;
   respectively substituting the second parameter of compression and the second estimated size after compression in the first variable and the second variable of the defined estimated math model for obtaining a second equation to be solved;

calculating the first and second undetermined coefficients by solving the first and second equations; and substituting the first and second undetermined coefficients in the estimated math model.

7. The method for estimating the image size after compression as claimed in claim 4, wherein the first parameter of compression is less than the second parameter of compression, and after the step of obtaining the first testing size after compression, the method further comprises:

determining whether the first testing size after compression obtained through the first parameter of compression falls within a target range; and when the first testing size after compression is not within the target range, conducting a binary search to adjust the first parameter of compression, until the first testing size after compression obtained falls within the target range.

8. The method for estimating the image size after compression as claimed in claim 1, wherein the step of calculating the target parameter of compression corresponding to the target size after compression through the estimated math model comprising:

calculating an inverse function model of the estimated math model; and substituting the target size after compression in the inverse function model to obtain the target parameter of compression.

9. The method for estimating the image size after compression as claimed in claim 1, wherein the estimated math model is a polynomial function model.

\* \* \* \* \*